Heinigke & Laemmel,

Marquetry.

No. 2,633. Reissued June 4, 1867.

Witnesses;
Wm. Thompson
Wm. Heinigke

Inventor
Otto Heinigke
Moritz Laemmel

AM. PHOTO-LITHO. CO. N.Y. (OSBORNE'S PROCESS)

United States Patent Office.

OTTO HEINIGKE AND MORITZ LAEMMEL, OF BAY RIDGE, NEW YORK.

*Letters Patent No.* 28,481, *dated May* 29, 1860; *reissue No.* 2,633, *dated June* 4, 1867.

METHOD OF PRODUCING MOSAIC VENEERS.

The Schedule referred to in these Letters Patent and making part of the same.

TO ALL WHOM IT MAY CONCERN:

Be it known that we, OTTO HEINIGKE and MORITZ LAEMMEL, both of Bay Ridge, in the county of Kings, and State of New York, have invented a new and improved Method of Producing Mosaic Veneers; and we do hereby declare that the following is a full, clear, and exact description thereof, reference being had to the accompanying drawings, making part of this specification, in which—

Figure 1:
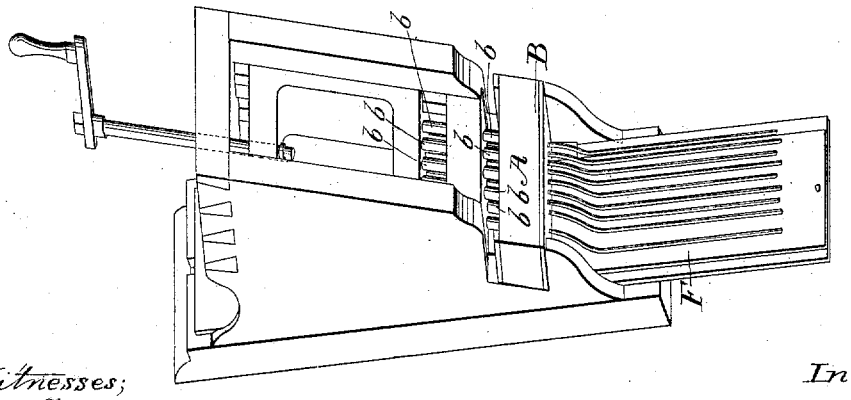

Figure 1 is a perspective view of a part of the apparatus which we have successfully used in working our said invention.

Figure 3:
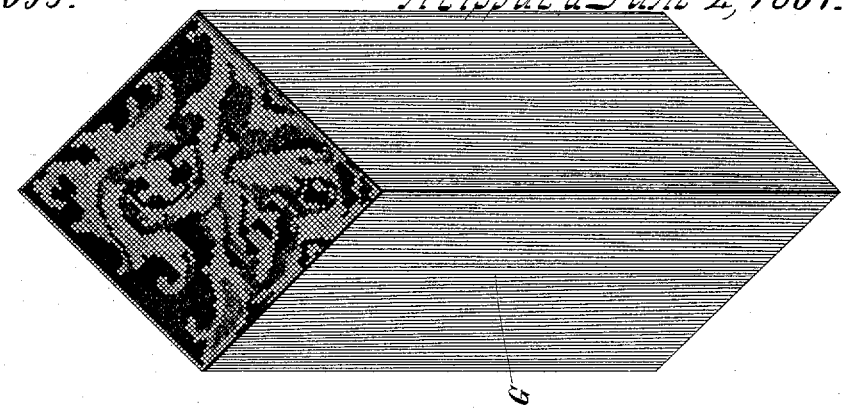
Figure 2:
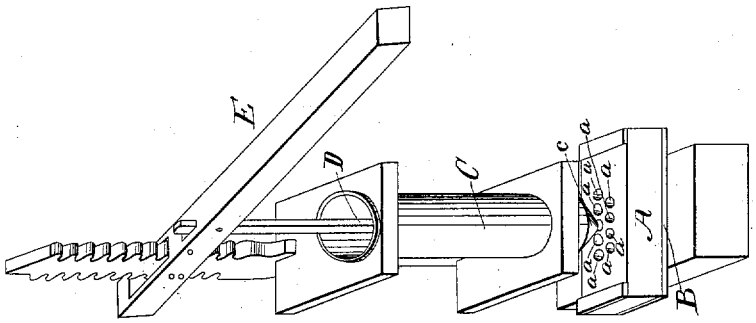

Figure 2, a like view of another part of the apparatus which we have used for the purpose; and Figure 3 is a perspective view of a block prepared according to our said invention, and ready for being cut into veneers.

The same letters indicate like parts in all the figures.

Our said invention relates to the production of mosaic veneers or surfaces, and consists, first, in the process of forming prismatoidal rods of a suitable form, and for the various colors required to form, when put together side by side, a surface with the required design, by forcing through apertures of the form of the cross-section of the intended rods, a plastic material, which after the rods have been formed will become, or which may be rendered, of sufficient hardness to be used as a veneer; and, second, in uniting such strips so formed into blocks, the cross-section of which will be of the form of the surface to be veneered or of a section thereof.

In working our said process we take some suitable material, which must be sufficiently plastic and tenacious at first to admit of being forced through an aperture of the size and form of the cross-section of the rod intended to be produced, and which afterwards will become or may be rendered sufficiently hard to answer for veneering surfaces. The material which we have successfully used, and which we prefer for this purpose, is composed of pipe-clay ground with linseed oil to a putty-like consistency. We have used it successfully when ground or mixed to different consistencies, but prefer to use it of the consistency of freshly made putty. The material thus prepared we divide into a number of parts equal to the number of colors contained in the pattern which is to be imitated. Each color is now forced through a metal plate containing one or more small apertures, whereby the plastic mass is divided into long, thin strips. The apertures in the metal plate give to the strips the required form, and by using an apparatus such as is shown in fig. 1, a number of these strips, and of different colors, may be formed at the same time. This apparatus contains a block, A, with a large number of cylindrical openings, *a*, (see fig. 2,) to receive the plunger *b*, and a perforated metal plate, B, is firmly secured to the under side of the block A. The perforations in the plate B correspond in shape to the shape of the several colors in the pattern to be copied, and each of the openings *a* is filled with a quantity of the plastic material of the desired color. For filling the opening *a* we use a device such as represented in fig. 2, consisting of a cylindrical vessel, C, with a pointed mouth-piece, *c*, at the bottom. A piston, D, is moved up and down in the interior of the vessel C by means of a lever, E. The mouth-piece *c* is brought successively over the openings contained in the block A, and by depressing the piston D the material contained in the cylindrical vessel C is forced out into the openings *a*. Several vessels, C, are kept on hand, and each one is filled with a different color, so that the openings in the block A can be filled with the proper colors in an easy manner. After all the openings *a* have been filled the block A is brought under the plungers *b*, fig. 1, and by depressing these plungers the mass contained in said openings is forced out through the perforations in the plate B, forming small strips of different colors, the colors being previously arranged according to the pattern to be copied. An inclined board, F, receives the strips as they ooze out of the holes in the plate B, and when long enough they are separated from the plate and pushed together by means of a straight-edge, and they are now united by pressing them together or by some suitable cement. By these means one portion after another of the pattern is represented by small, thin layers, each layer being formed by a number of said strips. By uniting these layers, blocks G are formed, the cross-section of which represents the pattern to be represented, or a portion of the same, as clearly shown in fig. 3. These blocks are now cut up crosswise into a number of thin plates, each plate of the thickness of an ordinary veneer; and by fastening the plates on a suitable surface in the desired order the pattern to be represented is faithfully copied.

From the foregoing it will be seen that mosaic veneers can be produced with any desired design and any variety of colors, and multiplied to any extent at much less cost than by any other process.

We have above stated the material which we have used with success, but we wish to be understood that we do not claim to have invented the composition of this material, as it has long been known and used for other purposes; nor do we wish to be understood as limiting our claim of invention to the process of making mosaic veneers from the material described, as any other material may be substituted which possesses the specified properties of plasticity that it may be formed into strips by being forced through apertures of the required form, and which will become, or which can be rendered, sufficiently hard to veneer surfaces.

What we claim as new, and desire to secure by Letters Patent, is—

1. The within-described method of producing mosaic veneers from strips of any desired cross-section, and of various colors, said strips being formed by pressing a suitable plastic material, which will harden after having gone through the whole process, through openings of the required shape, substantially as and for the purpose described.

2. Uniting the strips formed as above described into blocks G, a cross-section of which represents the pattern to be represented by the mosaic veneer, or a portion of the same, substantially in the manner and for the purpose specified.

OTTO HEINICKE,
MORITZ LAEMMEL.

Witnesses:
WM. H. BISHOP,
GEO. F. PABST.